US008442965B2

(12) United States Patent
Lopiano

(10) Patent No.: US 8,442,965 B2
(45) Date of Patent: May 14, 2013

(54) QUERY LANGUAGE IDENTIFICATION

(75) Inventor: Fabio Lopiano, Zurich (CH)

(73) Assignee: Google Inc., Mountain View, CA (US)

( * ) Notice: Subject to any disclaimer, the term of this patent is extended or adjusted under 35 U.S.C. 154(b) by 519 days.

(21) Appl. No.: 11/737,639

(22) Filed: Apr. 19, 2007

(65) Prior Publication Data

US 2011/0231423 A1 Sep. 22, 2011

Related U.S. Application Data

(60) Provisional application No. 60/793,677, filed on Apr. 19, 2006.

(51) Int. Cl.
*G06F 7/00* (2006.01)
*G06F 17/30* (2006.01)

(52) U.S. Cl.
USPC .................... 707/706; 707/728; 704/8

(58) Field of Classification Search ....... 707/4, 999.004, 707/760, 769, 706, 728; 704/8
See application file for complete search history.

(56) References Cited

U.S. PATENT DOCUMENTS

| | | | |
|---|---|---|---|
| 5,265,065 A | 11/1993 | Turtle | |
| 5,418,948 A | 5/1995 | Turtle | |
| 5,664,027 A * | 9/1997 | Ittner | 382/170 |
| 5,689,616 A * | 11/1997 | Li | 704/232 |
| 5,717,913 A | 2/1998 | Driscoll | |
| 5,835,912 A | 11/1998 | Pet | |
| 5,956,711 A | 9/1999 | Sullivan et al. | |
| 6,006,221 A | 12/1999 | Liddy et al. | |
| 6,076,088 A | 6/2000 | Paik et al. | |
| 6,078,914 A | 6/2000 | Redfern | |
| 6,094,647 A | 7/2000 | Kato et al. | |
| 6,167,369 A * | 12/2000 | Schulze | 704/9 |
| 6,263,335 B1 | 7/2001 | Paik et al. | |
| 6,272,456 B1 * | 8/2001 | de Campos | 704/8 |
| 6,292,772 B1 | 9/2001 | Kantrowitz | |
| 6,415,250 B1 * | 7/2002 | van den Akker | 704/9 |
| 6,519,585 B1 | 2/2003 | Kohli | |
| 6,546,365 B1 * | 4/2003 | Gajda et al. | 704/8 |
| 6,546,388 B1 | 4/2003 | Edlund et al. | |
| 6,594,657 B1 * | 7/2003 | Livowsky | 1/1 |
| 6,615,168 B1 | 9/2003 | Resnik et al. | |

(Continued)

FOREIGN PATENT DOCUMENTS

WO 02/31814 A1 4/2002

OTHER PUBLICATIONS

David A. Hull et al, "Querying Across Languages: A Dictionary-Based Approach to Multilingual Information Retrieval", 1996.*

(Continued)

*Primary Examiner* — Brannon W Smith
(74) *Attorney, Agent, or Firm* — Fish & Richardson P.C.

(57) ABSTRACT

Methods, systems, and apparatus, including computer program products, for identifying the language of a search query. In one embodiment, the language of each term of a query is determined from the query terms and the language of the user interface a user used to enter the query. In another embodiment, an automatic interface language classifier is generated from a collection of past queries each submitted by a user. In some embodiments, a score is determined for each of multiple languages, each score indicating a likelihood that the query language is the corresponding one of the multiple languages.

15 Claims, 3 Drawing Sheets

U.S. PATENT DOCUMENTS

| | | | |
|---|---|---|---|
| 6,715,130 | B1 | 3/2004 | Eiche et al. |
| 6,999,932 | B1 * | 2/2006 | Zhou .............................. 704/277 |
| 7,054,803 | B2 | 5/2006 | Eisele |
| 7,103,532 | B1 * | 9/2006 | Murray et al. .................... 704/8 |
| 7,120,869 | B2 | 10/2006 | Birder |
| 7,191,116 | B2 | 3/2007 | Alpha |
| 7,260,570 | B2 * | 8/2007 | Brown et al. ......................... 1/1 |
| 7,277,846 | B2 * | 10/2007 | Satoh ................................ 704/3 |
| 7,333,928 | B2 * | 2/2008 | Wang et al. ........................ 704/9 |
| 7,386,438 | B1 | 6/2008 | Franz et al. |
| 7,451,129 | B2 * | 11/2008 | Lamping et al. ...................... 1/1 |
| 7,451,130 | B2 * | 11/2008 | Gupta et al. .......................... 1/1 |
| 7,475,063 | B2 | 1/2009 | Datta et al. |
| 7,478,033 | B2 | 1/2009 | Wu |
| 7,599,916 | B2 | 10/2009 | Weare |
| 7,689,554 | B2 * | 3/2010 | Jones et al. ............ 707/999.004 |
| 7,716,049 | B2 * | 5/2010 | Tian .............................. 704/251 |
| 7,836,051 | B1 | 11/2010 | Mason |
| 7,895,193 | B2 | 2/2011 | Cucerzan |
| 7,912,907 | B1 | 3/2011 | Mantel et al. |
| 7,996,208 | B2 * | 8/2011 | Elbaz et al. ........................ 704/8 |
| 2001/0047261 | A1 * | 11/2001 | Kassan ........................ 704/270 |
| 2002/0052871 | A1 | 5/2002 | Chang et al. |
| 2002/0059069 | A1 | 5/2002 | Hsu et al. |
| 2002/0091661 | A1 | 7/2002 | Anick et al. |
| 2002/0145742 | A1 | 10/2002 | Koenig et al. |
| 2002/0161733 | A1 | 10/2002 | Grainger |
| 2003/0018468 | A1 * | 1/2003 | Johnson et al. .................... 704/8 |
| 2003/0037136 | A1 | 2/2003 | Labovitz et al. |
| 2003/0097252 | A1 | 5/2003 | Mackie |
| 2003/0149686 | A1 * | 8/2003 | Drissi et al. ....................... 707/3 |
| 2003/0149687 | A1 * | 8/2003 | Brown et al. ...................... 707/3 |
| 2003/0217052 | A1 | 11/2003 | Rubenczyk |
| 2004/0064447 | A1 | 4/2004 | Simske et al. |
| 2004/0133418 | A1 | 7/2004 | Turcato et al. |
| 2004/0153435 | A1 | 8/2004 | Gudbjartsson et al. |
| 2004/0261021 | A1 | 12/2004 | Mittal et al. |
| 2004/0264479 | A1 | 12/2004 | Raghunandan |
| 2005/0065774 | A1 | 3/2005 | Doganata et al. |
| 2005/0108200 | A1 | 5/2005 | Meik et al. |
| 2005/0154578 | A1 | 7/2005 | Tong et al. |
| 2005/0177358 | A1 | 8/2005 | Melomed et al. |
| 2005/0216253 | A1 | 9/2005 | Brockett |
| 2006/0025988 | A1 | 2/2006 | Xu et al. |
| 2006/0031207 | A1 | 2/2006 | Bjarnestam et al. |
| 2006/0112091 | A1 | 5/2006 | Chapman et al. |
| 2006/0161543 | A1 * | 7/2006 | Feng et al. ......................... 707/5 |
| 2006/0195461 | A1 | 8/2006 | Lo et al. |
| 2006/0277189 | A1 | 12/2006 | Cencini |
| 2006/0293874 | A1 * | 12/2006 | Zhang et al. ....................... 704/2 |
| 2007/0016476 | A1 | 1/2007 | Hoffberg et al. |
| 2007/0129935 | A1 | 6/2007 | Uchimoto et al. |
| 2007/0219933 | A1 | 9/2007 | Datig |
| 2007/0244866 | A1 | 10/2007 | Mishkanian et al. |
| 2007/0288230 | A1 | 12/2007 | Datta et al. |
| 2007/0288448 | A1 | 12/2007 | Datta |
| 2007/0288449 | A1 | 12/2007 | Datta et al. |
| 2007/0288450 | A1 | 12/2007 | Datta et al. |
| 2008/0059153 | A1 | 3/2008 | Bennett |
| 2008/0175373 | A1 * | 7/2008 | Naick et al. .............. 379/265.09 |
| 2009/0070097 | A1 * | 3/2009 | Wu et al. ........................... 704/2 |
| 2012/0109978 | A1 | 5/2012 | Datta |

OTHER PUBLICATIONS

Paul McNamee, "Language Identification: A Solved Problem Suitable for Undergraduate Instruction", 2004.*

Craig Silverstein et al, "Analysis of a Very Large AltaVista Query Log", 1998.*

Step Two Designs Pty Ltd, "Deploying an effective search engine," 2001, p. 6.

International Search Report and Written Opinion of the International Searching Authority, PCT Application Serial No. PCT/US2007/67014, Jun. 23, 2008, 12 pp.

Berger, "Activation on the Move: Adaptive Information Retrieval via Spreading Activation," dated Jul. 8, 2003, 105 pages.

Gong, "Semantic Documents for Web Ontology Building," Mar. 14, 2005; 50 pages.

Kapetanios et al., "Multi-lingual Web Querying: A Parametric Linguistics Based Approach," dated Apr. 19, 2006; 12 pages.

O'Hara, "Empirical Acquisition of Conceptual Distinctions via Dictionary Definitions," dated Aug. 31, 2005, 175 pages.

International Preliminary Report on Patentability for PCT International Application No. PCT/US2007/067014, dated Oct. 22, 2008, 9 pages.

Chinese Office Action for Application No. 200780021902.1, dated Mar. 4, 2010, 3 pages.

Bashir Ahmed et al., "Language Identification from Text Using N-gram Based Cumulative Frequency Addition", Proceeding of Student/Faculty Research Day, CSIS, Pace University, May 7, 2004, 8 pages.

Supplementary European Search Report for Application No. EP 07 76 095, dated Jul. 8, 2011, 6 pages.

Chinese Office Action for Chinese Application No. 201010546580.6 filed Oct. 25, 2010, dated Apr. 26, 2012, 4 pages.

* cited by examiner

QUERY LANGUAGE IDENTIFICATION

CROSS-REFERENCE TO RELATED APPLICATIONS

This application claims the benefit under 35 U.S.C. §119(e) of U.S. Patent Application No. 60/793,677, titled "Query Language Identification," filed Apr. 19, 2006, which is incorporated here by reference.

BACKGROUND

This specification relates to identifying a query language for some or all of the search terms in a search query.

Search engines allow users to find documents (e.g., web pages) using text queries. Each query typically includes one or more search terms that the user selects. A search engine uses the term or terms in the query to present potentially relevant documents to the user.

In order to provide the best results for a query, the search engine can augment the user's query with variants of some query terms to improve recall and precision. For example, if a user submitted the term "job," the search engine can augment it by adding the term "jobs" to the search. Similarly, if a user submitted the term "car," the search engine can augment it by adding the term "automobile" to the search.

The way in which queries are augmented is generally language dependent. For example, while "automobile" is synonymous with "car" in English, it is not in French, where "car" means "because." In addition, diacritical expansions (e.g., Zunrich to Zurich and Zuerich) that can be used to augment a query are also generally language dependent.

SUMMARY

This specification discloses various embodiments of technologies for using the terms of a search query with inferred identifications of the respective language or languages of the terms.

In general, one aspect of the subject matter described in this specification can be embodied in methods that include the actions of receiving a search query from a user through a user interface. The user interface has an interface language that is a natural language. The methods further include the actions of determining a natural-language query language for the query from the query terms and the interface language. Other embodiments of this aspect include corresponding systems, apparatus, and computer program products.

These and other embodiments can optionally include one or more of the following features. A score is determined for each of multiple languages, the score indicating a likelihood that the query language is that one of the multiple languages. A query language is determined based on a plurality of query records associated with the user interface, each query record referring to a query received by the user interface in the past. Each query record associates the query received with one or more result documents where each result document has a language. Determining a score for each of multiple languages can include, for each query term and for each of multiple languages, determining the score based on the number of times each respective query term appears in one or more documents in the respective language. Each of the documents are from a corpus of documents wherein documents are labeled as containing content in one of the multiple languages. An interface language classifier can be generated based on an initial distribution, the initial distribution based on the plurality of query records, the initial distribution indicating what proportion of queries were in a particular language.

In general, another aspect of the subject matter described in this specification can be embodied in methods that include the action of generating an automatic query language classifier from 1) a collection of past queries each submitted by a respective user, 2) information identifying for each query an interface language of an interface through which the query was received, and 3) information identifying user-selected results that were selected by the respective user from results generated in response to the query when it was originally submitted. Other embodiments of this aspect include corresponding systems, apparatus, and computer program products.

These and other embodiments can optionally include one or more of the following features. Queries in the collection received in each interface language can be manually labeled. The interface language classifier can be tuned based on which manually labeled queries were misclassified by the classifier. Generating an interface language classifier can include testing the interface language classifier based on the collection of past queries where the test compares, for each query, a query language predicted by the classifier and a document language of the one or more result documents.

Particular embodiments can be implemented to realize one or more of the following advantages. The language of a query can be determined from with the interface in which the query was received as well as the words of the query. Query language determination is generally not affected by words (e.g., English jargon) that are frequently borrowed by multiple languages. The language of a query that includes pair-wise combinations of words can be accurately determined even if the words in the pair would separately indicate an erroneous language.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
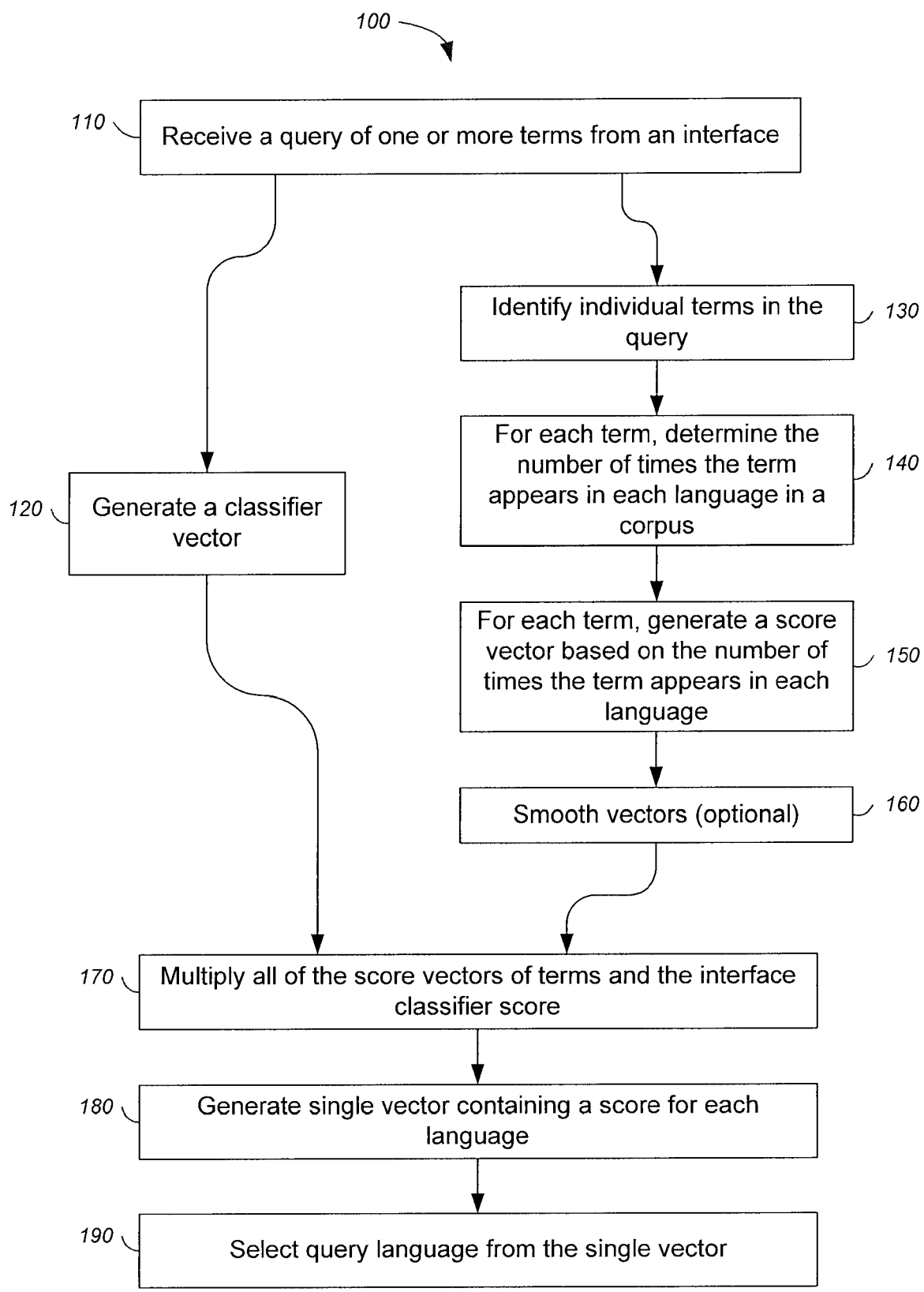
FIG. 1 is a flowchart of a process for identifying the language of a query.

As shown in FIG. 1, a process 100 identifies the likely language of a search query. A query is received from an interface that has an interface language (step 110). The interface language is the language in which the interface presents information to a user, e.g., English, French, or Esperanto. However, the words within a query are not necessarily in the interface language.

The process 100 includes determining which languages the query is likely to be in given the interface that receives the query (step 120). An interface classifier can be used for this purpose. One kind of interface classifier is described in detail below, in reference to FIG. 2. The interface classifier generates a classifier vector containing scores for each potential language of the query. Each score, between zero and one inclusive, indicates the likelihood of the query being in the corresponding particular language.

The process 100 identifies individual terms from the query (step 130). Generally, the terms will be individual words.

The identification of words depends on the particular conventions of each potential query language. In Latin script languages, for example, words are delimited by spaces or other punctuation (e.g., '-').

The process 100 determines how often each word from the query occurs within documents of each language in a training corpus of documents (step 140). The training corpus is ideally a collection of documents representative of documents contained in a search corpus. Alternatively, the training corpus and the search corpus can be the same, or the training corpus can be a snapshot of, or an extract from, the search corpus. The training corpus should contain documents from all languages represented in the search corpus. The training corpus should contain a sufficient number of documents in each language so that the documents in the aggregate contain a significant portion of the distinct words found within all documents of the language in the search corpus.

In general, the number of times a word occurs in documents of each language is normalized based on the number of documents in the training corpus of the respective language. In other words, the number of times a word occurs in the documents of a given language is divided by the total number of documents in that given language. For example, a word might occur in 100000 English documents and 10000 Czech documents, but when both values are divided by the total number of documents in those languages it may be the case that the word is relatively more frequent in Czech than in English.

The language of each document in the corpus can be determined based on the content of each respective document. Document language identification is further described in U.S. Patent Application No. 60/793,708, entitled "Identifying a Property of a Document," to Xin Liu, filed on Apr. 19, 2006, the entire disclosure of which is incorporated here by reference.

Any documents in the training corpus for which the language cannot be determined accurately can be ignored or omitted. In some implementations, to determine whether the language associated with a document is accurate, the words of the document are compared to the most common words (e.g., the top 50 words) of the language. If some of these most common words are not found in the document, then the document is likely misclassified and can be omitted from the training corpus. In such implementations, shorter documents, which are less likely to include most of the comment words, are more likely to be omitted. In general, short documents are more likely to be misclassified and so, in some implementations, all documents that have sufficiently few words (e.g., less than a pre-determined threshold) can be omitted.

Using the training corpus, the process 100 generates a score vector that, for each language, gives a score in the range of zero to one inclusive that indicates a likelihood that a word from the query is in the language. For example, a score can be calculated for each language by dividing the number of times the word occurs in a particular language within the corpus by the number of times the word occurs in all languages. A score vector is generated for each word in the query (step 150).

In general, to simplify score vector generation, the training corpus can be analyzed offline, apart from query language determination. When the training corpus is analyzed offline, a score vector is generated for each unique word in the corpus. The score vectors are stored for later use. During query language determination, the previously-stored score vector for each query word is used rather than calculating the score vector on-the-fly in response to each query.

In some implementations, score vectors are generated offline (e.g., in advance) for only the words that are most frequently found in the corpus. The number of words for which score vectors are generated can depend on the number of documents in a particular language within the corpus. For example, if the corpus has relatively few documents in a particular language, then score vectors for a larger proportion of words can be generated. If the corpus has relatively many documents for a particular language, then a relatively smaller portion of words can be processed. However, this relatively smaller portion is likely to contain most, if not all, of the words that are frequently used in the language.

Words that appear in many different languages, for example, jargon or proper names (e.g., "Internet"), can unduly affect the score vector for that word. The score vector of such a word, if found among the query words, can be set to indicate that the word is likely in the interface language. Alternatively, such words can be ignored.

The process 100 can optionally smooth each score vector (step 160). In one implementation, while computing the score vector, a small smoothing value s is added to reduce noise. For example, if word (or term) t occurs n times in language L and N times across k languages, then the probability that the term is in language L is smoothed to be $P(L|t)=(n+s)/(k \times s+N)$, rather than $P(L|t)=n/N$. The smoothing value can be selected depending on size of N and k. For example, s can be selected to increase as N increases and to decrease as k increases. In some implementations, $s=(N+p)/(k^q)$, with $p>0$ and $q>0$. Suitable values of p and q include $p=0.25$ and $q=1.25$.

All of the score vectors from the previous steps (e.g., score vectors for each word and the classifier score vector) are multiplied together (step 170). To multiply two score vectors, the score of each language in one score vector is simply multiplied with the score of each respective language in the other score vector. The resultant score vector is a query language score vector (step 180). This vector contains, for each language, a score that indicates the likelihood that the query is in the language. The language with the highest score is selected (step 190) as the query language attributed to the query.

The process 100 can optionally include selectively combining words. Some words occur in many languages, but combinations of them generally occur in fewer or only one language. For example, "Palo" and "Alto", separately, occur in English and Spanish, but combined "Palo Alto" is more likely to be found in English than in Spanish documents. To identify the language of combined words, pairs of words from the query can be compared to pairs of words in the corpus. While processing the training corpus (whether on-the-fly or offline), pairs of words that occur with sufficient frequency (e.g., more than would be expected from random distribution of words) are identified. During offline analysis pair-wise score vectors can be generated for each identified word pair (i.e., pair of adjacent words).

When scoring a query, each pair of words in the query can be initially treated as a single atomic word. If a word pair occurs in the training corpus sufficiently often, then the score vector for the word pair is used in lieu of two separate score vectors for each word. After initial treatment of the query words as pairs, any words in the query that are not part of a frequently-occurring word pair are scored individually.

The process can also optionally include associating users with particular languages. This can include determining a user's prevalent search language based on a user's history of searching. A user who has searched predominantly in a particular language in the past is likely to be searching in that same language in the future. In some implementations, a user language vector is built for the user indicating a historical language preference for the user. The user language vector corresponds in structure to the query language score vectors, providing a factor in the range of zero to one inclusive for each of a set of languages. Some implementations limit each user language vector to non-zero probabilities for only the top 3 or 4 languages its user has used. This user language vector can be one of a number of vectors multiplied together to determine a final probability distribution over a set of languages. In this way, with similar vectors, the final probability can be determined from a variety of information sources, including user histories, countries, character sets, and so on.

Figure 2:
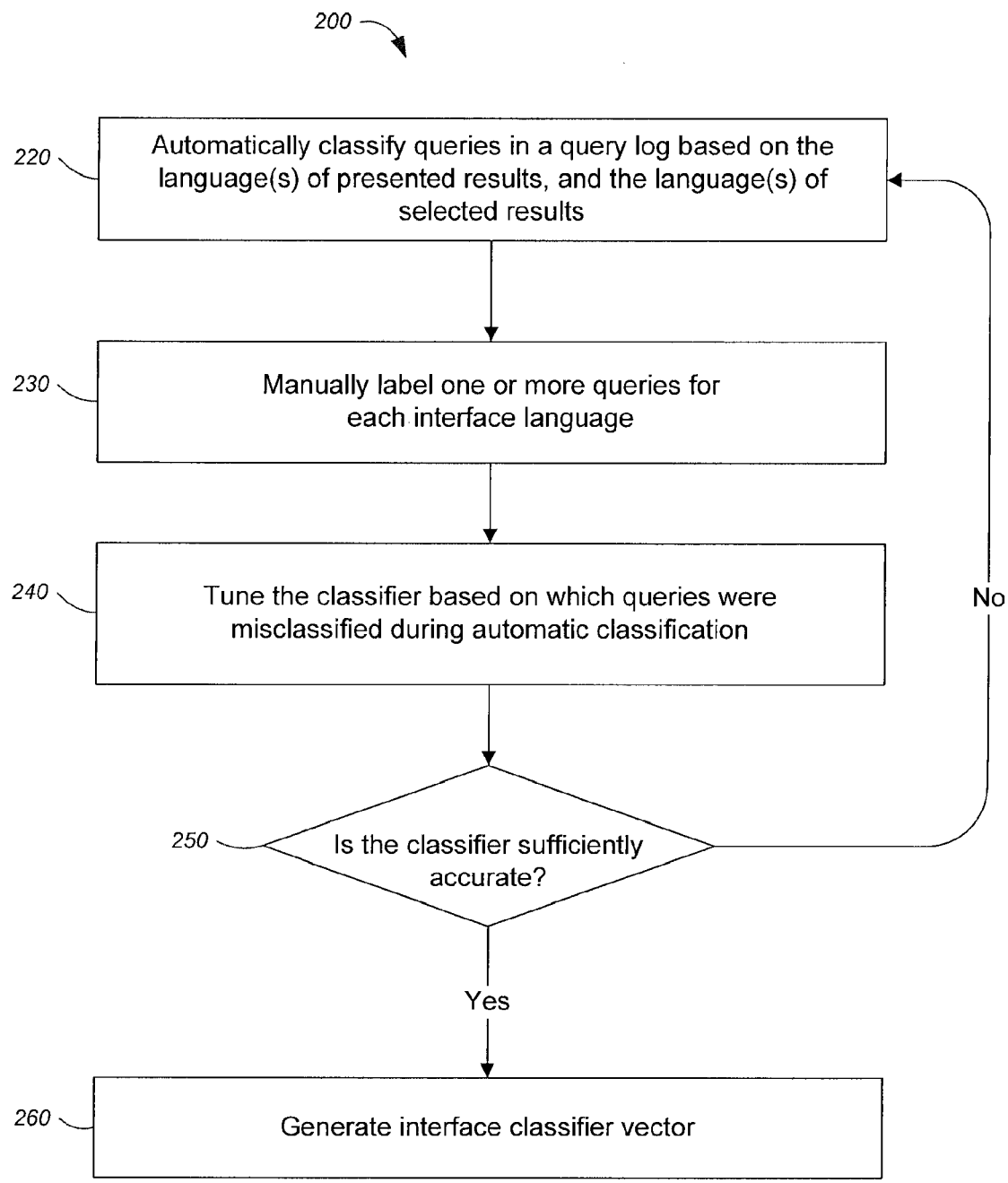
FIG. 2 is a flowchart of a process for building a query language classifier.

FIG. 2 illustrates a process 200 for training an interface classifier. The classifier is trained using a collection of queries (e.g., a query log). The collection includes records of received queries, including the language of the interface that each query was received in and the search results that were presented in response to each query. The collection can also include records of any results selected by the user for each query. Each result, selected or not, refers to a document whose language is known.

For each interface, the process 200 classifies each query in the collection of queries from the interface (step 220). Queries are classified using a Nayve Bayes classifier based on the language of the interface from which the query was received, the languages of the presented results and the languages of the results selected by the user. Other features can also be used.

The classification of queries is used to generate an initial distribution of prior probabilities representing the languages of previously-received queries. This distribution is used as the classifier for predicting a language of a query given a particular interface. For example, the language distribution of queries for the French interface can indicate that 75% of queries are French, while 10% are English and 5% are Italian. Thus, the interface classifier would predict that one out of ten queries received from the French interface will be English.

The initial distribution effectively seeds the interface classifier, which is iteratively improved in subsequent steps. Typically, at least some of the resultant classifications will be erroneous. Misclassification can occur because users select results in a language different from the actual query language. Misclassification can also occur because documents in one language contain foreign words—causing the returned results to include a significant proportion of non-query-language documents.

A language expert labels some of the queries received from each interface (step 230). The language expert labels a query based on the words of query rather than the results or selected results of the query. The labeling information identifies each labeled query as being in a particular language. This is a manual step in the process.

The classifier is tuned based on queries that were correctly or incorrectly classified during the previous automatic classification (step 240). The classifier is tuned by adjusting the value of the prior probabilities on which the classifier is based. For example, prior probabilities can be adjusted based on the number of times that a labeled query occurs in the collection of queries. In some implementations, tuning may be necessary if the collection of queries is not completely accurate (e.g., if the collection has missing or duplicate query logs).

The process 200 determines whether the classifier is sufficiently accurate (step 250). To assess the tuned classifier's accuracy, the tuned classifier is used to reclassify all queries in the collection. The reclassified queries can be compared to the labeled queries to determine the accuracy of the tuned classifier. This can be determined based on a pre-defined accuracy threshold. Optionally, determining the accuracy of the classifier can be judged by a language expert. In addition, an indirect technique for measuring the effectiveness of the classifier can be used, in which a number of random queries are run through the classifier and raters evaluate the search results compared to the search results for the same search engine, but without query classifier. This is indirect because what is actually measured is the overall effect of the query language classifier on synonyms, stemming, diacriticals, language demotion, and so on.

If the tuned classifier is not accurate enough, the classifier can be improved by repeating the labeling and tuning steps. When the classifier is sufficiently accurate, the process 200 generates a classifier vector for each interface based on the classifier (step 260).

Figure 3:
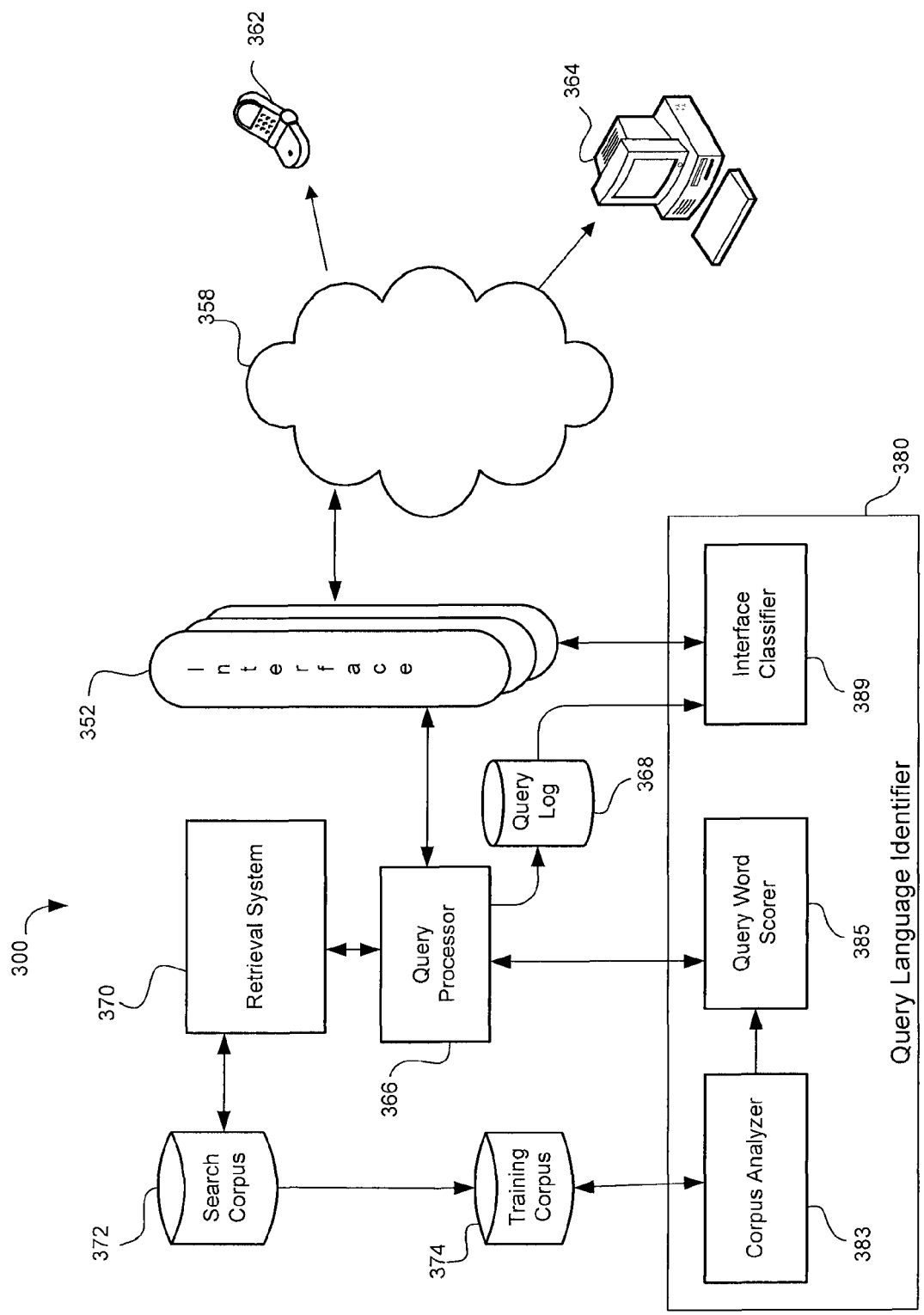
FIG. 3 is a diagram of a system for determining the language of a query.

FIG. 3 is a diagram of a system 300 for determining the language of a query. The system 300 includes interfaces 352, each in a different language. The interfaces allow users to use and interact with the services of the system. In particular, the interfaces receive queries from users. A query includes a sequence of words, and each word can be in any language. None of the words in the query need be in the language of the interface. The specific interface 352 which receives a user's query, or the language of the interface, can be chosen by the user.

The system 300 can be connected to a data communication network 358 and thereby can communicate with various devices connected to the network, for example, wireless communication devices 362 or personal computers 364. The communication flow for any device can be bidirectional so that system 300 receives information (e.g., queries or the contents of documents) from the devices and can also send information (e.g., results) to the devices.

Queries received by the interface 352 are provided to a query processor 366. The query processor 366 can pass the query on to another component of the system 300. For example, query processor 366 can cause a retrieval system 370 to generate search results that match the query. Such a retrieval system 370 can use data retrieval and search techniques, like those used by the Google™ search engine and other search engines, to obtain search results from a search corpus 372. The results generated by retrieval system 370 can then be provided to the original querying device.

The query processor 366 can optionally manipulate or augment any query that it receives before passing it on to other components of the system 300. To guide manipulation or augmentation of a query, the query process 366 can use on a query language identifier 380 to determine the language of a particular query.

The query language identifier 380 determines the language of a particular query based on a query word scorer 385. The query word scorer 385 scores each individual word in the query, generating a score that, for each language, indicates the likelihood that the word is in the language. The query word scorer 385 can rely on a corpus analyzer 383 to count the appearance of words in documents within a training corpus 374. In some implementations, the training corpus 374 can be a sample or subset of the search corpus 372. In some implementations, the corpus analyzer 383 can analyze the training corpus 374 asynchronously to receiving and scoring queries (e.g., the corpus can be analyzed offline).

The query language identifier 380 can include an interface classifier 389 which determines the language that a query is likely to be in given the interface 352 that received the query. The interface classifier 389 can be based on (e.g., be trained with) a query log 368. The query log 368 can be populated with records of queries received by the query processor 366. The query language identifier 380 uses the scores from the query word scorer 385 together with language identified by the interface classifier 389 to determine the language of the received search query.

In general, parts of the system 300 can be combined or divided and implemented in some combination of hardware or software on one or more computing devices connected by one or more networks.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments of the invention have been described. Nevertheless, it will be understood that various modifications may be made without departing from the spirit and scope of the invention.

What is claimed is:

1. A computer implemented method, comprising:
providing, in a system comprising one or more computers, a plurality of user interfaces through which search queries are received, wherein each user interface is in a respective interface language, and wherein each interface language is a natural language in which a respective user interface presents information;
maintaining a collection of query records, wherein the collection of query records includes distinct subsets of query records, wherein each distinct subset of query records is associated with a respective user interface of the plurality of user interfaces, wherein each query record associates a past query with one or more result documents, and wherein each result document has an associated natural language;
receiving, in the system, through a first user interface of the plurality of user interfaces, a search query comprising one or more query terms; and
determining, by the system, a query language of the search query from the search query, the interface language of the first user interface, and the distinct subset of query records that is associated with the first user interface, the query language being a natural language;
wherein determining the query language of the search query further comprises:
for each of multiple languages,
calculating a first score for each query term and the respective language, each first score indicating the likelihood that the respective query term is in the respective language, wherein the first score is calculated based on a plurality of documents, each document having an associated natural language,
calculating a second score for the respective language, the second score indicating the likelihood that the search query is in the respective language given the interface language of the first user interface through which the search query was received, where the second score is calculated based on the plurality of query records, and
calculating a third score for the respective language, the third score being a combination of the first score for the respective language and the second score for the respective language; and
determining the query language based on the third scores for the multiple languages.

2. The method of claim 1 where calculating the first score includes:
for each query term:
determining the first score based on a number of times each respective query term appears in the plurality documents in the respective language, the plurality of documents being from a corpus of documents, each document in the corpus of documents being labeled as containing content in one of the multiple languages.

3. The method of claim 1, where determining the query language further comprises:
using an interface language classifier to determine a respective likelihood of the languages that the query is in given the user interface that received the query.

4. The method of claim 3, further comprising:
classifying each past query in the collection of query records based on one or more of the following: (i) the interface language of the user interface through which the past query was received, (ii) the natural language of the one or more result documents associated with the past query, and (iii) the natural language of the one or more result documents that were selected by the user;
generating an initial distribution of the past queries based on the classifying, wherein the initial distribution indicates what proportion of the past queries from the plurality of query records were in a particular language; and
training the interface language classifier using the initial distribution.

5. The method of claim 1, further comprising:
training an interface language classifier using the collection of query records, wherein each query record of the collection includes a past query received by the system from a respective user, information identifying one or more result documents associated with the past query received by the system, and information identifying which of the one or more result documents associated with the past query were selected by the user for the past query, and wherein the training includes:
classifying each past query in the collection based on one or more of the following: the interface language of the user interface through which the past query was received, the natural language of the one or more result documents associated with the past query, and the natural language of the one or more result documents that were selected by the user; and
tuning the interface language classifier based on queries that were correctly or incorrectly classified by the classifying until the tuned interface language classifier is sufficiently accurate; and
using the trained interface classifier to generate a respective interface classifier vector for each of the plurality of user interfaces.

6. A computer program product, encoded on a non-transitory machine-readable storage device, operable to cause data processing apparatus to perform operations comprising:
providing, in a system comprising one or more computers, a plurality of user interfaces through which search queries are received, wherein each user interface is in a respective interface language, and wherein each interface language is a natural language in which a respective user interface presents information; maintaining a collection of query records, wherein the collection of query records includes distinct subsets of query records, wherein each distinct subset of query records is associated with a respective user interface of the plurality of user interfaces, wherein each query record associates a past query with one or more result documents, and wherein each result document has an associated natural language;

receiving, in the system, through a first user interface of the plurality of user interfaces, a search query comprising one or more query terms; and determining, by the system, a query language of the search query from the search query, the interface language of the first user interface, and the distinct subset of query records that is associated with the first user interface, the query language being a natural language;

wherein determining the query language of the search query further comprises:

for each of multiple languages, calculating a first score for each query term and the respective language, each first score indicating the likelihood that the respective query term is in the respective language, wherein the first score is calculated based on a plurality of documents, each document having an associated natural language, calculating a second score for the respective language, the second score indicating the likelihood that the search query is in the respective language given the interface language of the first user interface through which the search query was received, where the second score is calculated based on the plurality of query records, and calculating a third score for the respective language, the third score being a combination of the first score for the respective language and the second score for the respective language; and determining the query language based on the third scores for the multiple languages.

7. The product of claim 6 where calculating the first score includes:

for each query term:

determining the first score based on a number of times each respective query term appears in the plurality documents in the respective language, the plurality of documents being from a corpus of documents, each document in the corpus of documents being labeled as containing content in one of the multiple languages.

8. The product of claim 6, where determining the query language further comprises:

using an interface language classifier to determine a respective likelihood of the languages that the query is in given the user interface that received the query.

9. The product of claim 8, further comprising:

classifying each past query in a collection of query records based on one or more of the following: (i) the interface language of the user interface through which the past query was received, (ii) the natural language of the one or more result documents associated with the past query, and (iii) the natural language of the one or more result documents that were selected by the user;

generating an initial distribution of the past queries based on the classifying, wherein the initial distribution indicates what proportion of the past queries from the plurality of query records were in a particular language; and training the interface language classifier using the initial distribution.

10. The product of claim 6, further comprising:

training an interface language classifier using the collection of query records, wherein each query record of the collection includes a past query received by the system from a respective user, information identifying one or more result documents associated with the past query received by the system, and information identifying which of the one or more result documents associated with the past query were selected by the user for the past query, and wherein the training includes:

classifying each past query in the collection based on one or more of the following: the interface language of the user interface through which the past query was received, the natural language of the one or more result documents associated with the past query, and the natural language of the one or more result documents that were selected by the user; and tuning the interface language classifier based on queries that were correctly or incorrectly classified by the classifying until the tuned interface language classifier is sufficiently accurate; and using the trained interface classifier to generate a respective interface classifier vector for each of the plurality of user interfaces.

11. A system comprising:

a plurality of user interfaces through which search queries are received, wherein each user interface is in a respective interface language, and wherein each interface language is a natural language in which a respective user interface presents information;

a collection of query records, wherein the collection of query records includes distinct subsets of query records, wherein each distinct subset of query records is associated with a respective user interface of the plurality of user interfaces, wherein each query record associates a past query with one or more result documents, and wherein each result document has an associated natural language;

one or more computers configured to perform operations comprising:

receiving, through the first user interface, a search query comprising one or more query terms;

determining, by the system, a query language of the search query from the search query, the interface language of the first user interface, and the distinct subset of query records that is associated with the first user interface, the query language being a natural language;

wherein determining the query language of the search query further comprises:

for each of multiple languages, calculating a first score for each query term and the respective language, each first score indicating the likelihood that the respective query term is in the respective language, where the first score is calculated based on a plurality of documents, each document having an associated natural language, calculating a second score for the respective language, the second score indicating the likelihood that the search query is in the respective language given the interface language of the first user interface through which the search query was received, where the second score is calculated based on the plurality of query records, and calculating a third score for the respective language, the third score being a combination of the first score for the respective language and the second score for the respective language; and determining the query language based on the third scores for the multiple languages.

12. The system of claim 11 where calculating the first score includes:

for each query term:
: determining the first score based on a number of times each respective query term appears in the plurality documents in the respective language, the plurality of documents being from a corpus of documents, each document in the corpus of documents being labeled as containing content in one of the multiple languages.

13. The system of claim 11, where determining the query language further comprises:
: using an interface language classifier to determine a respective likelihood of the languages that the query is in given the user interface that received the query.

14. The system of claim 13, wherein the operations further comprise:
: classifying each past query in a collection of query records based on one or more of the following: (i) the interface language of the user interface through which the past query was received, (ii) the natural language of the one or more result documents associated with the past query, and (iii) the natural language of the one or more result documents that were selected by the user;
: generating an initial distribution of the past queries based on the classifying, wherein the initial distribution indicates what proportion of the past queries from the plurality of query records were in a particular language; and
: training the interface language classifier using the initial distribution.

15. The system of claim 11, wherein the operations further comprise:
: training an interface language classifier using the collection of query records, wherein each query record of the collection includes a past query received by the system from a respective user, information identifying one or more result documents associated with the past query received by the system, and information identifying which of the one or more result documents associated with the past query were selected by the user for the past query, and wherein the training includes:
: classifying each past query in the collection based on one or more of the following: the interface language of the user interface through which the past query was received, the natural language of the one or more result documents associated with the past query, and the natural language of the one or more result documents that were selected by the user; and
: tuning the interface language classifier based on queries that were correctly or incorrectly classified by the classifying until the tuned interface language classifier is sufficiently accurate; and
: using the trained interface classifier to generate a respective interface classifier vector for each of the plurality of user interfaces.

* * * * *

UNITED STATES PATENT AND TRADEMARK OFFICE
CERTIFICATE OF CORRECTION

| | | |
|---|---|---|
| PATENT NO. | : 8,442,965 B2 | Page 1 of 1 |
| APPLICATION NO. | : 11/737639 | |
| DATED | : May 14, 2013 | |
| INVENTOR(S) | : Lopiano | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 92 days.

Signed and Sealed this
Sixteenth Day of December, 2014

Michelle K. Lee
*Deputy Director of the United States Patent and Trademark Office*